United States Patent
Hsu et al.

(10) Patent No.: US 10,600,196 B2
(45) Date of Patent: *Mar. 24, 2020

(54) DISTANCE MEASUREMENT DEVICE BASED ON PHASE DIFFERENCE

(71) Applicant: PixArt Imaging Inc., Hsin-Chu County (TW)

(72) Inventors: En-Feng Hsu, Hsin-Chu County (TW); Chia-Yu Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 114 days.

This patent is subject to a terminal disclaimer.

(21) Appl. No.: 15/951,529

(22) Filed: Apr. 12, 2018

(65) Prior Publication Data

US 2018/0232898 A1 Aug. 16, 2018

Related U.S. Application Data

(63) Continuation of application No. 15/150,584, filed on May 10, 2016, now Pat. No. 9,978,154.

(30) Foreign Application Priority Data

Jul. 2, 2015 (TW) .............................. 104121577 A

(51) Int. Cl.
- *G06K 9/00* (2006.01)
- *G06T 7/557* (2017.01)
- *G01J 9/00* (2006.01)

(52) U.S. Cl.
CPC ................ *G06T 7/557* (2017.01); *G01J 9/00* (2013.01)

(58) Field of Classification Search
CPC ... G01J 9/00; G01C 3/08; G01C 3/085; G06F 3/0304; G01S 17/36; G01S 17/08; G01S 17/32; G01S 17/42; G01S 17/48; G01S 17/88; G01S 17/4812; G01S 17/4815; G01S 17/4915; G06T 7/557; G06T 7/521; G06K 7/10722; G06K 9/00255; G02B 7/34; G02B 7/343; G02B 7/346; G02B 7/365; G02B 21/004; G02B 21/0056; G02B 21/0068; G02B 21/008; G01M 11/0207; G01M 11/025; G01M 11/0257; G01M 11/0271; G01D 5/38; H04N 5/23212; H04N 5/243; H01L 27/14627; H01L 27/14623; H01L 27/14685; G01B 11/22

See application file for complete search history.

(56) References Cited

U.S. PATENT DOCUMENTS

| 2006/0204121 | A1 | 9/2006 | Bryll | |
| 2009/0295964 | A1* | 12/2009 | Utagawa | H04N 5/2254 348/302 |
| 2009/0322918 | A1* | 12/2009 | Shintani | G02B 7/34 348/294 |
| 2010/0053354 | A1* | 3/2010 | Hayasaka | H04N 5/2254 348/222.1 |

(Continued)

*Primary Examiner* — Jose L Couso
(74) *Attorney, Agent, or Firm* — WPAT, PC

(57) ABSTRACT

A distance measurement device including a pixel array and a cover layer is provided. The cover layer is covered on the pixel array. The cover layer includes a first cover pattern covering on a first area of a plurality of first pixels and a second cover pattern covering on a second area of a plurality of second pixels. The first area and the second area are rectangles of mirror symmetry along a first direction.

16 Claims, 8 Drawing Sheets

(56) References Cited

U.S. PATENT DOCUMENTS

| | | |
|---|---|---|
| 2013/0136363 A1 | 5/2013 | Na |
| 2014/0145068 A1 | 5/2014 | Meynants |
| 2015/0365584 A1 | 12/2015 | Samurov et al. |
| 2016/0313118 A1* | 10/2016 | Hsu .......................... G01C 3/08 |
| 2017/0064219 A1* | 3/2017 | Lin .......................... H04N 5/33 |
| 2017/0094153 A1* | 3/2017 | Wang ................. H04N 5/23212 |
| 2017/0261318 A1* | 9/2017 | Takagi ................... G01C 3/085 |

* cited by examiner

DISTANCE MEASUREMENT DEVICE BASED ON PHASE DIFFERENCE

CROSS REFERENCE TO RELATED APPLICATION

This application is a continuation application of U.S. application Ser. No. 15/150,584, filed on May 10, 2016, which claims the priority benefit of Taiwan Patent Application Serial Number 104121577, filed on Jul. 2, 2015, the full disclosure of which is incorporated herein by reference.

BACKGROUND

1. Field of the Disclosure

This disclosure generally relates to an optical sensing element, more particularly, to a distance measurement device based on phase difference and a distance measurement method thereof.

2. Description of the Related Art

In general, a distance measurement system employs a light source and calculates an object distance according to energy of light beam of the light source reflected back by the object. Traditionally, it is able to calculate the distance using the triangulation method or time-of-flight (TOF) technique. However, the above methods require a higher cost and larger system size.

In addition, the development of gesture recognition generally removes the background image at first by using a 3D image in order to separate the foreground image. In this technique, two image sensors are used such that the size and cost of a gesture recognition module can not be effectively reduced.

As mentioned above, the present disclosure obtains a 3D image by using the phase detection, and an additional illumination light (as used in the TOF technique mentioned above) is not required. Meanwhile, in the proposed technique of the present disclosure, the distance measurement and the gesture recognition are implemented by only employing a single image sensor.

SUMMARY

Accordingly, the present disclosure provides an optical distance measurement device and a distance measurement method thereof with advantages of low cost and small size.

The present disclosure provides a distance measurement device including a condensing lens, an image sensor and a processor. The condensing lens has a predetermined focal length. The image sensor is configured to detect light passing through the condensing lens and output an image frame. The image sensor includes a pixel matrix, a cover layer and a plurality of microlenses. The pixel matrix includes a first pixel group and a second pixel group arranged in a first direction and a second direction. The cover layer covers upon a first region of a plurality of first pixels of the first pixel group and upon a second region of a plurality of second pixels of the second pixel group, wherein the first region and the second region are rectangles of mirror symmetry along the first direction, and the rectangles fully cover one of four edges of the first pixels and the second pixels in the first direction. Each of the microlenses is aligned with at least one of one of the first pixels and one of the second pixels. The processor is configured to calculate a depth of an image region in the image frame.

The present disclosure further provides a distance measurement device including a condensing lens, a pixel matrix and a cover layer. The condensing lens has a predetermined focal length. The pixel matrix includes a first pixel group, a second pixel group, a third pixel group and a fourth pixel group arranged along a first direction and a second direction, and configured to detect light passing through the condensing lens to output an image frame. The cover layer covers upon the pixel matrix and includes a first cover pattern covering upon a first region of a plurality of first pixels of the first pixel group, a second cover pattern covering upon a second region of a plurality of second pixels of the second pixel group, a third cover pattern covering upon a third region of a plurality of third pixels of the third pixel group, and a fourth cover pattern covering upon a fourth region of a plurality of fourth pixels of the fourth pixel group, wherein the first region and the second region are rectangles of mirror symmetry along the first direction, the third region and the fourth region are rectangles of mirror symmetry along the second direction, the rectangles fully cover one of four edges of the first pixels and the second pixels in the first direction, and the rectangles fully cover one of four edges of the third pixels and the fourth pixels in the second direction.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
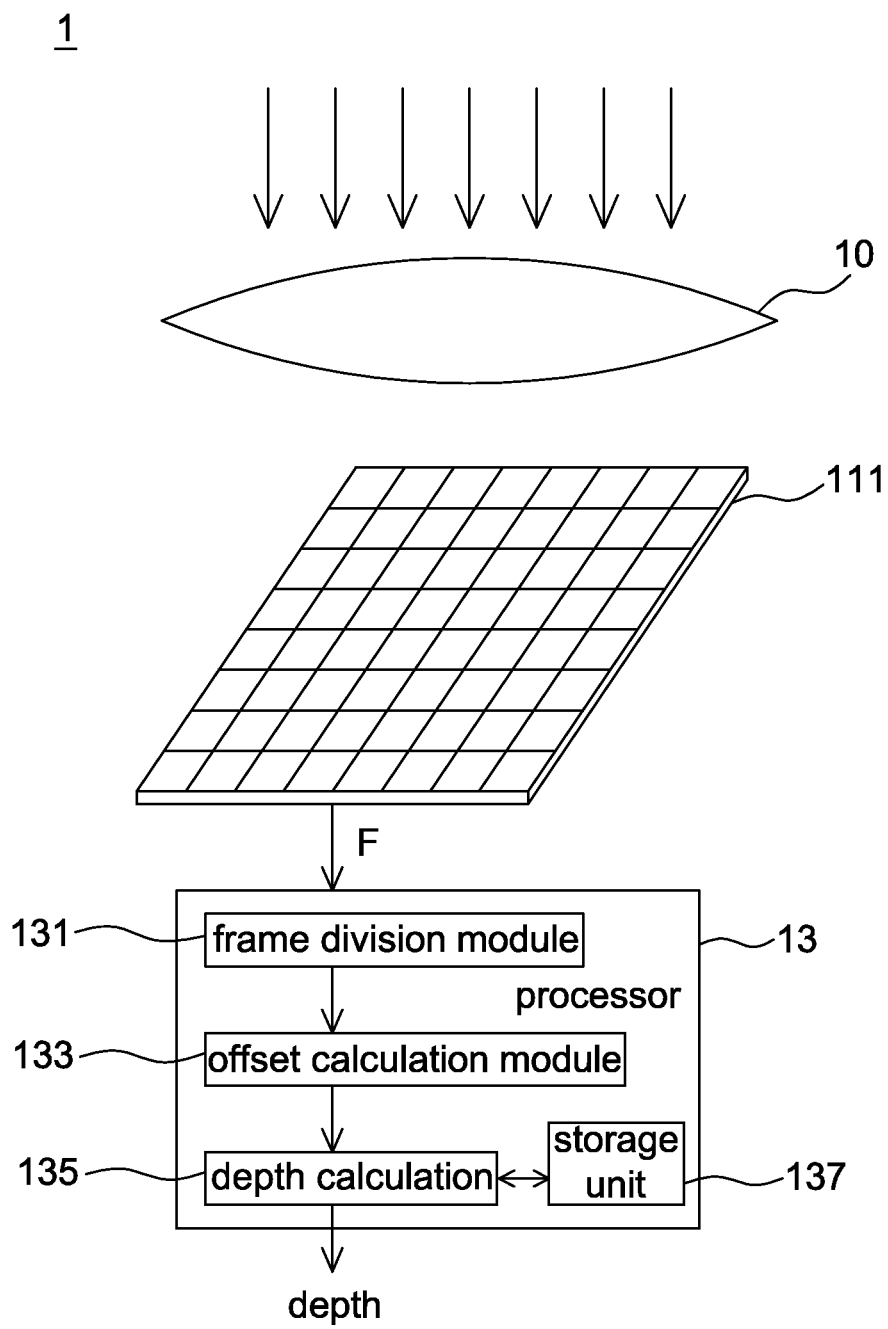
FIG. 1 is a schematic block diagram of a distance measurement device according to one embodiment of the present disclosure.
Figure 2A:
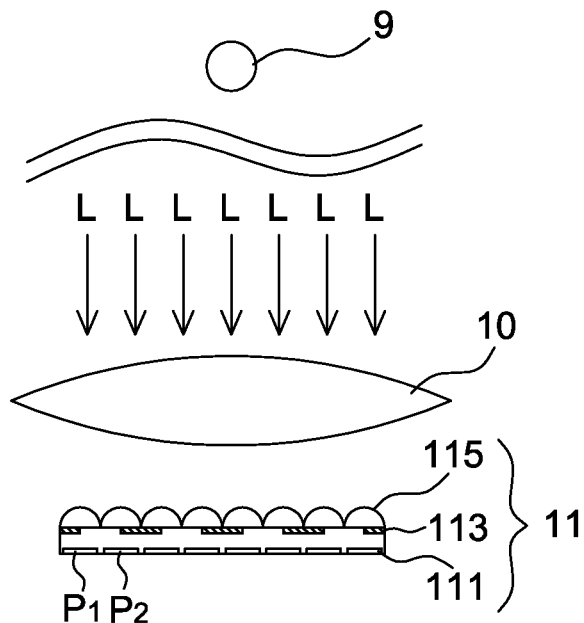
FIGS. 2A-2B are cross sectional views of an image sensor and a condensing lens of a distance measurement device according to some embodiments of the present disclosure.
Figure 2B:
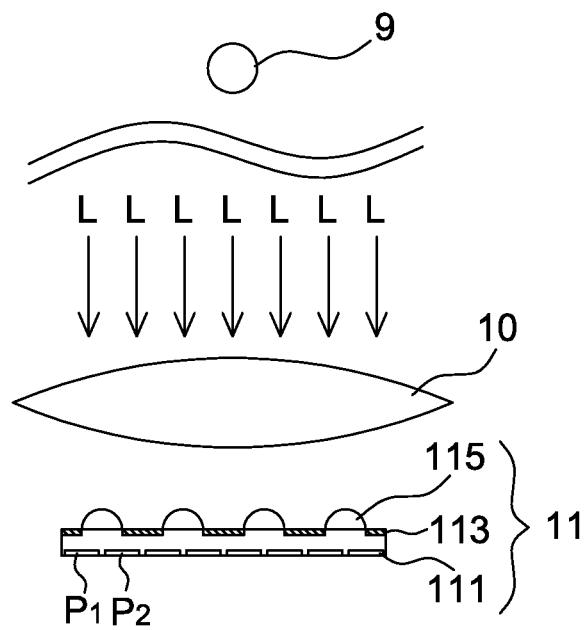

Referring to FIGS. 1 and 2A-2B, FIG. 1 is a schematic block diagram of a distance measurement device 1 according to one embodiment of the present disclosure; and FIGS. 2A-2B are cross sectional views of an image sensor and a condensing lens of a distance measurement device according to some embodiments of the present disclosure. The distance measurement device 1 includes a condensing lens 10, an image sensor 11 and a processor 13. In some embodiments, the processor 13 is, for example, disposed in a chip together with the image sensor 11. In some embodiments, the processor 13 is an external processing unit of the image sensor 11, and configured to receive and process an image frame F captured by the image sensor 11 for calculating a depth of at least one image region or constructing a depth map of the image frame F, i.e., a depth map of a plurality of image regions. For example, the processor 13 is a microprocessor (MCU), a central processing unit (CPU), a digital signal processor (DSP) or the like for processing the image frame F outputted by the image sensor 11.

The condensing lens 10 is arranged, for example, inside a lens of an image capturing device (e.g., a camera). The condensing lens 10 is a single lens or a lens set arranged along an optical axis without particular limitations. For simplification purposes, a single lens is shown herein. The condensing lens 10 is used as a lens window configured to collect light L from an object 9 and guide the light L to the image sensor 11. A distance between the condensing lens 10 and the image sensor 11 is preferably equal to a first focal length of the condensing lens 10 (e.g., the focal length at a side of the image sensor 11).

The image sensor 11 detects light passing through the condensing lens 10 based on a predetermined focal length and outputs an image frame F. The image sensor 11 includes a pixel matrix 111 (e.g., an 8×8 pixel matrix is shown herein for illustration purposes), a cover layer 113 and a plurality of microlenses 115, wherein the cover layer 113 is patterned to cover upon at least a part of a plurality of pixels included in the pixel matrix 111 such that uncovered regions of the pixels receive incident light of different phases through different parts of the microlenses 115. The predetermined focal length herein is referred to a focal length formed by both the condensing lens 10 and the microlenses 115, and at a light incident side of the condensing lens 10. The predetermined focal length is sometimes referred to a predetermined focal length of the condensing lens 10 or of the image sensor 11 for abbreviation.

The inventor noticed that when an object 9 reflects the light L at a second focal length of the condensing lens 10 (e.g., a focal length at the other side of the image sensor 11, i.e. the predetermined focal length) to the distance measurement device 1, an object image in the image frame F outputted from the image sensor 11 does not have a position shift; whereas, when the object 9 is not at the second focal length of the condensing lens 10, the object image in the image frame F outputted by the image sensor 11 has a position shift toward different directions in subframes corresponding to pixels of different cover patterns, illustrated hereinafter with an example. Accordingly, a depth difference of the object 9 deviated from the predetermined focal length is identifiable according to the position shift so as to obtain a distance (i.e. a depth) from the image sensor 11 (or the condensing lens 10) to implement a distance measurement device 1 of the present disclosure.

Figure 3:
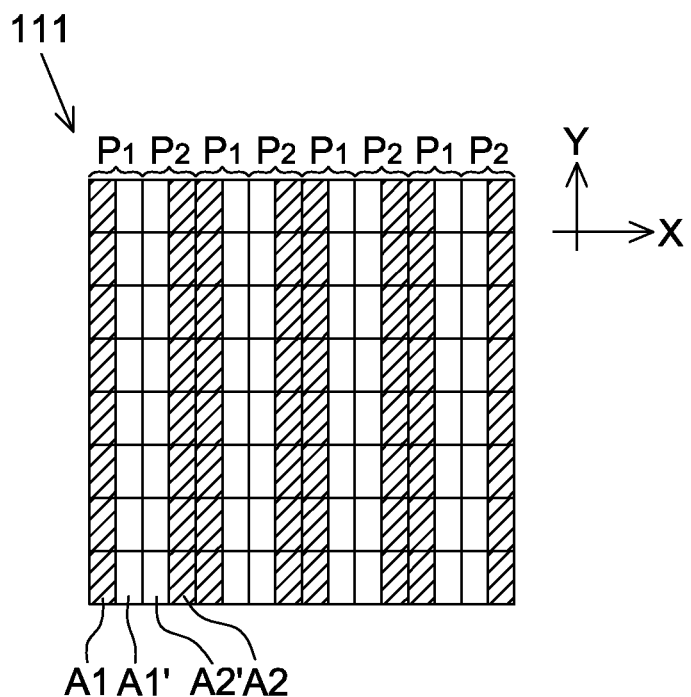
FIG. 3 is a schematic diagram of a pixel matrix and a cover layer of a distance measurement device according to one embodiment of the present disclosure.

Referring to FIG. 3, it is a schematic diagram of a pixel matrix and a cover layer of a distance measurement device according to one embodiment of the present disclosure. In one embodiment, the pixel matrix 111 includes a first pixel group $P_1$ and a second pixel group $P_2$ arranged in a first direction (e.g., X direction) and a second direction (e.g., Y direction). It should be mentioned that in the present disclosure, the first pixel group $P_1$ and the second pixel group $P_2$ have different covered regions. For example, in a monochromatic image sensor, pixel structures of the first pixel group $P_1$ and the second pixel group $P_2$ are identical, whereas the cover patterns thereupon are different. For example, in a color image sensor, both the first pixel group $P_1$ and the second pixel group $P_2$ include, for example, red pixels (e.g., forming a red filter on a pixel), green pixels (e.g., forming a green filter on a pixel), blue pixels (e.g., forming a blue filter on a pixel) or pixels of other colors, but the cover patterns upon the first pixel group $P_1$ and the second pixel group $P_2$ are different.

The cover layer 113 is formed, for example, by the metal layer which is used as electrical paths (e.g., at least one layer of M1 to M10 of the CMOS manufacturing process), an opaque layer different from the metal layer or a combination thereof without particular limitations. In this embodiment, the cover layer 113 covers upon a first region A1 of a plurality of first pixels of the first pixel group $P_1$ and upon a second region A2 of a plurality of second pixels of the second pixel group $P_2$. In FIG. 3, the second region A2 is at a side along the first direction (e.g., X direction) and the first region A1 is at a side of an inverse direction of the first direction such that the first region A1 of the first pixel group $P_1$ and the second region A2 of the second pixel group $P_2$ form rectangles of mirror symmetry along the first direction. In addition, the first pixel group $P_1$ has an uncovered region A1' outside the first region A1, and the second pixel group $P_2$ has an uncovered region A2' outside the second region A2, wherein the uncovered regions A1' and A2' receive incident light of different phases respectively through different parts of the microlenses 115.

For example in FIG. 3, the first region A1 is shown at a left side of the first pixels and the second region A2 is shown at a right side of the second pixels. It should be mentioned that although FIG. 3 shows that the first region A1 and the second region A2 are 50% of an area of a single pixel, it is only intended to illustrate but not to limit the present disclosure. In other embodiments, the first region A1 and the second region A2 are 5% to 95% of an area of a single pixel without particular limitations.

The microlenses 115 are aligned with at least one of one of the first pixels and one of the second pixels. In some embodiments, the microlenses 115 are respectively aligned with each of the first pixels and each of the second pixels, as shown in FIG. 2A. In another embodiment, each of the microlenses 115 is aligned with the uncovered region A1' outside the first region A1 of the first pixels and the uncovered region A2' outside the second region A2 of the second pixels at the same time, as shown in FIG. 2B. Accordingly, the first pixel group $P_1$ and the second pixel group $P_2$ receive incident light of different phases respectively through a first part of the microlenses 115 (e.g., the right part of the microlenses 115) and a second part of the microlenses 115 (e.g., the left part of the microlenses 115). It should be mentioned that although FIGS. 2A and 2B show that the uncovered regions (e.g., A1' and A2') of the first pixel group $P_1$ and the second pixel group $P_2$ are substantially a half of the microlenses 115, they are only intended to illustrate but not to limit the present disclosure. It is appreciated that the part of light capable of penetrating the microlenses 115 to reach the uncovered regions is determined according to the first region A1 and the second region A2 of the cover layer 113. In the present disclosure, the first part and the second part of the microlenses 115 are selected to be 5% to 95% of the microlenses 115.

The processor 13 is used to calculate a depth of at least one image region in an image frame F, e.g., dividing the image frame F into a first subframe and a second subframe, calculating an offset corresponding to the image region according to the first subframe and the second subframe, and calculating the depth according to the offset, wherein the first subframe is associated with the first pixel group $P_1$ and the second subframe is associated with the second pixel group $P_2$. More specifically, the first subframe is formed by gray level data outputted by the first pixel group $P_1$ and second subframe is formed by gray level data outputted by the second pixel group $P_2$.

Referring to FIGS. 1 to 4, FIG. 4 is an operational schematic diagram of a distance measurement method according to one embodiment of the present disclosure. In one embodiment, the processor 13 includes a frame division module 131, an offset calculation module 133, a depth calculation module 135 and a storage unit 137, wherein the frame division module 131, the offset calculation module 133 and the depth calculation module 135 are implemented by software and/or hardware without particular limitations. For illustration purposes, the frame division module 131, the offset calculation module 133 and the depth calculation module 135 are shown to be separated from each other, but operations thereof are considered to be accomplished by the processor 13. The storage unit 137 previously stores a relationship, e.g., formed as a lookup table, of a plurality of offsets with respect to a plurality of depth differences distanced from the predetermined focal length for the depth calculation module 135 to calculate the depth of at least one image region according to the calculated offset.

More specifically, the predetermined focal length is already known. When an offset corresponding to an image region is obtained, a depth difference of the image region from the predetermined focal length is obtainable according to the lookup table, and the depth of the at least one image region is obtainable by adding the depth difference to or subtracting the depth difference from the predetermined focal length.

Figure 4:
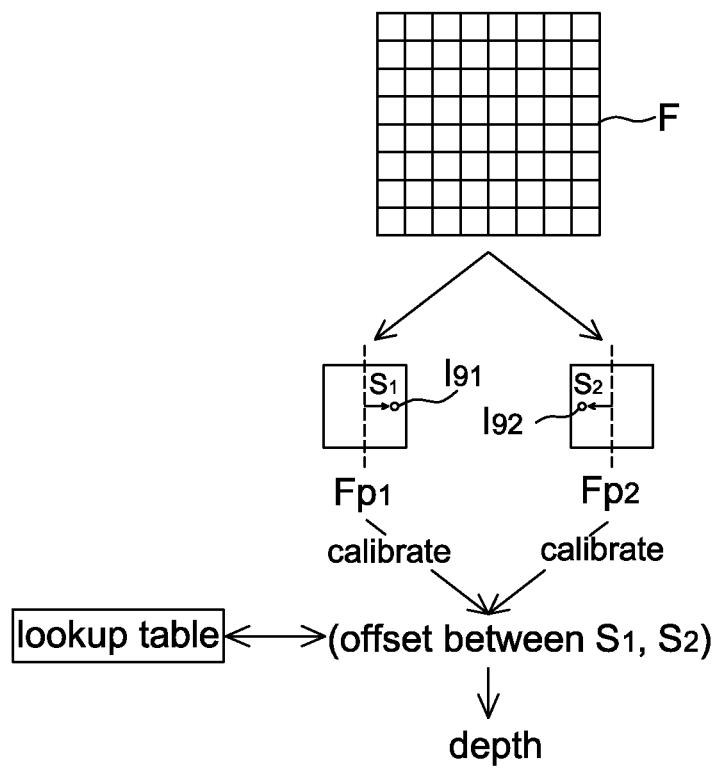
FIG. 4 is an operational schematic diagram of a distance measurement method according to one embodiment of the present disclosure.

In FIG. 4, a dot object 9 located at a light incident side of the condensing lens 10 is taken as an example for illustration. The image sensor 11 captures, based on a predetermined focal length, and outputs an image frame F to the processor 13. The frame division module 131 divides the image frame F into a first subframe $F_{P1}$ and a second subframe $F_{P2}$, wherein the first subframe $F_{P1}$ is associated with the first pixel group $P_1$ and the second subframe $F_{P2}$ is associated with the second pixel group $P_2$. When the object 9 is located at the second focal length (i.e. the predetermined focal length) of the condensing lens 10, image regions associated with the object 9 in the first subframe $F_{P1}$ and the second subframe $F_{P2}$ are substantially at corresponding positions with no offset. When the object 9 is not located at the second focal length of the condensing lens 10, the image regions associated with the object 9 in the first subframe $F_{P1}$ and the second subframe $F_{P2}$ have an offset therebetween and are not at corresponding positions. For example, FIG. 4 shows that a first image region $I_{91}$ in the first subframe $F_{P1}$ shifts rightward from a center line (e.g., the dashed line) by $S_1$, and a second image region $I_{92}$ in the second subframe $F_{P2}$ shifts leftward from a center line (e.g., dashed line) by $S_2$. The offset calculation module 133 calculates an offset between $S_1$ and $S_2$, e.g., $(S_1-S_2)$. It is appreciated that the offset is not limited to be calculated based on the center line, and the center line used herein is only taken as an example. It is also possible to calculate the offset by using the block matching or motion detection without particular limitations as long as the offset between corresponded image regions (e.g., $I_{91}$ and $I_{92}$) in the first subframe $F_{P1}$ and the second subframe $F_{P2}$ are obtainable.

It should be mentioned that although FIG. 4 shows that the first image region $I_{91}$ shifts rightward by $S_1$ and the second image region $I_{92}$ shifts leftward by $S_2$, it is only intended to illustrate but not to limit the present disclosure. The shift direction of the image region corresponding to the object 9 is determined according to whether the object 9 is close to or away from the condensing lens 10 from the second focal length as well as the covered regions (e.g., A1 and A2) of the first pixel group $P_1$ and the second pixel group $P_2$. For example, FIG. 4 shows a condition under the arrangement of FIG. 2A when the object 9 is far from the condensing lens 11 from the second focal length thereof.

The depth calculation module 135 calculates a depth of the image region according to the offset between $S_1$ and $S_2$ in conjunction with a relationship of a plurality of offsets with respect to a plurality depth differences deviated from the predetermined focal length previously stored in the storage unit 137. For example, when $S_1$ and $S_2$ are substantially identical to zero, it is able to identify that a depth of the image region is substantially equal to the second focal length, which is known previously. In one embodiment, said relationship is a relation of offsets between $S_1$ and $S_2$ with respect to depth differences from the predetermined focal length. Meanwhile, under the arrangement of FIG. 2A and assuming that a right side of a center line in FIG. 4. is positive and a left side of the center line in FIG. 4 is negative, when $(S_1-S_2)$ is a negative value, it means that the depth is smaller than the second focal length; whereas, when $(S_1-S_2)$ is a positive value, it means that the depth is larger than the second focal length. If the offset is not calculated by subtraction, a direction of the depth difference is determined according to a direction of shift.

It should be mentioned that in this embodiment the image region is shown as a circle (corresponding to the dot object 9) for illustration purposes, but the present disclosure is not limited thereto. The image region is any feature (e.g., edges) in the image frame F capable of showing an offset without particular limitations.

In addition, to increase the identification accuracy, the processor 13 further calibrates brightness of the first subframe $F_{P1}$ and the second subframe $F_{P2}$ to be substantially identical by a shading algorithm. Accordingly, it is able to correctly identify corresponded image regions (e.g., image regions having identical brightness) in the first subframe $F_{P1}$ and the second subframe $F_{P2}$, e.g., $I_{91}$ and $I_{92}$. For example, when the image frame F contains a plurality of pixel regions, depths of the plurality of pixel regions are calculated respectively by using the same method mentioned above so as to construct a depth map.

In addition, FIG. 3 shows that the first pixel group $P_1$ and the second pixel group $P_2$ are arranged alternatively along the X direction. In other embodiments, it is possible that the first pixel group $P_1$ and the second pixel group $P_2$ are arranged alternatively along the Y direction; in this case, the dashed lines in FIG. 4 are changed to horizontal lines and the image regions are shifted upward and downward from the center line. Since only the shift direction is different but the calculation itself is not changed, details thereof are not repeated herein.

Figure 5A:
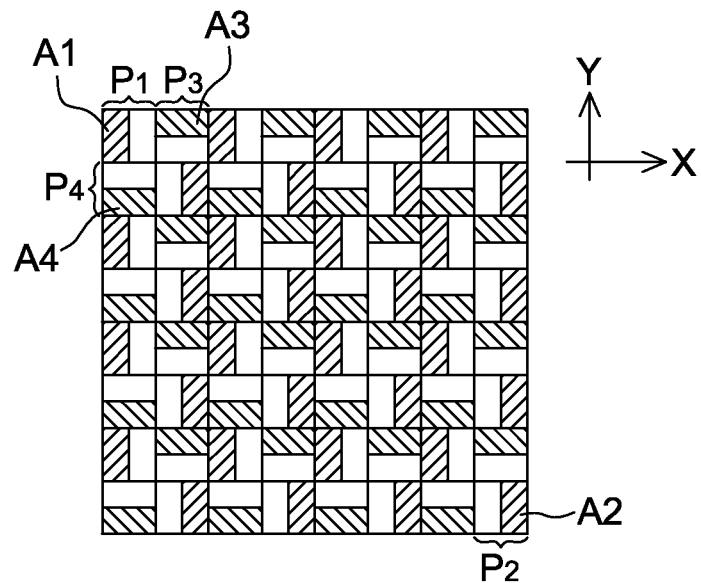
FIGS. 5A-5D are schematic diagrams of a pixel matrix and a cover layer of a distance measurement device according to some embodiments of the present disclosure.
Figure 5B:
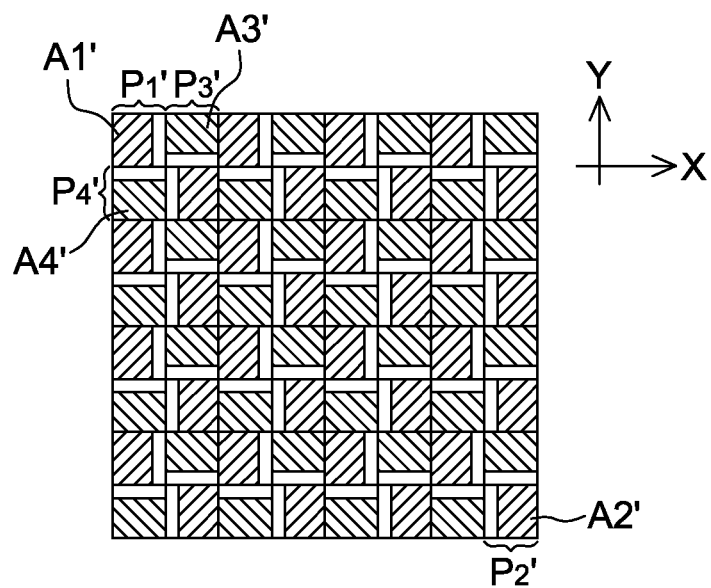

Referring to FIGS. 5A and 5B, they are schematic diagrams of a pixel matrix and a cover layer of a distance measurement device according to some embodiments of the present disclosure. In this embodiment, the pixel matrix 111 further includes a third pixel group $P_3$ and a fourth pixel group $P_4$ arranged in the first direction (e.g., X direction) and the second direction (e.g., Y direction). The cover layer 113 further covers upon a third region A3 of a plurality of third pixels of the third pixel group $P_3$ and upon a fourth region A4 of a plurality of fourth pixels of the fourth pixel group $P_4$, wherein the third region A3 is at a side along the second direction (e.g., Y direction) and the fourth region A4 is at a side along an inverse direction of the second direction. For example in FIGS. 5A to 5B, the third region A3 is at an upper side of the third pixels and the fourth region A4 is at a lower side of the fourth pixels such that the third region A3 and the fourth region A4 form rectangles of mirror symmetry along the second direction.

More specifically, in the embodiments of FIGS. 5A to 5B, the cover layer 113 covers upon the pixel matrix 111 and includes a first cover pattern covering upon a first region Al of a plurality of first pixels of the first pixel group $P_1$, a second cover pattern covering upon a second region A2 of a plurality of second pixels of the second pixel group $P_2$, a third cover pattern covering upon a third region A3 of a plurality of third pixels of the third pixel group $P_3$, and a fourth cover pattern covering upon a fourth region A4 of a plurality of fourth pixels of the fourth pixel group $P_4$, wherein the first region Al and the second region A2 form rectangles of mirror symmetry along a first direction and adjacent to each other along a diagonal direction of the pixel matrix, and the third region A3 and the fourth region A4 form rectangles of mirror symmetry along a second direction and adjacent to each other along another diagonal direction of the pixel matrix. In one embodiment, the first direction is perpendicular to the second direction.

In this embodiment, one first pixel $P_1$ ($P_1'$), one second pixel $P_2$ ($P_2'$), one third pixel $P_3$ ($P_3'$) and one fourth pixel $P_4$ ($P_4'$) adjacent to each other form a sub pixel group, and the first region A1 (A1'), the second region A2 (A2'), the third region A3 (A3') and the fourth region A4 (A4') in the sub pixel group have substantially identical areas, wherein the first pixels (i.e. the first cover pattern) are adjacent to the second pixels (i.e. the second cover pattern) along a diagonal direction, and the third pixels (i.e. the third cover pattern) are adjacent to the fourth pixels (i.e. the fourth cover pattern) along another diagonal direction.

In one embodiment, all the first region Al, the second region A2, the third region A3 and the fourth region A4 of the pixel matrix 111 have substantially identical areas (as shown in FIGS. 5A to 5B), e.g., 5% to 95% of an area of a single pixel.

Figure 5C:
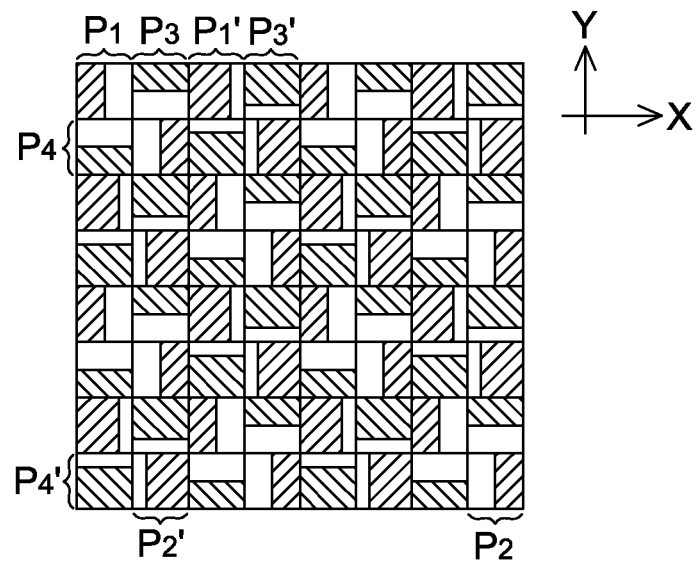
Figure 5D:
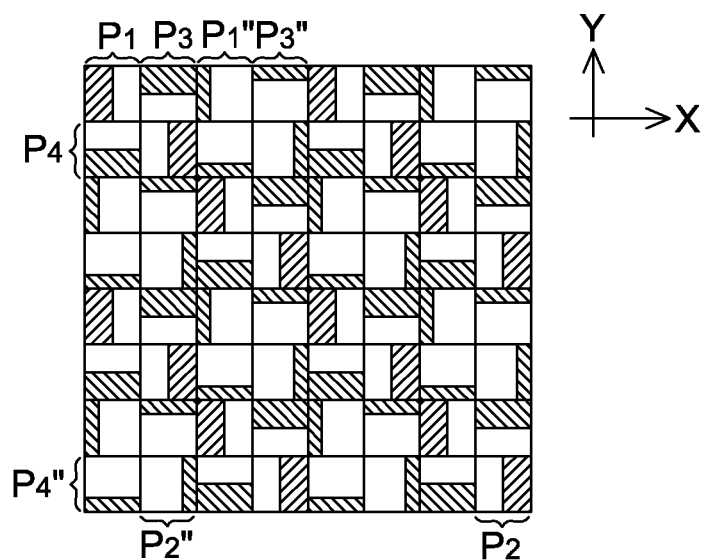

Referring to FIGS. 5C to 5D, they are schematic diagrams of a pixel matrix and a cover layer of a distance measurement device according to some embodiments of the present disclosure. In other embodiments, the covered areas in two sub pixel groups adjacent along the first direction (e.g., X direction) and the second direction (e.g., Y direction) are different. In some embodiments, the first region to the fourth region of a first sub pixel group (e.g., formed by pixels $P_1$ to $P_4$) are 50% of an area of a single pixel, and the first region to the fourth region of a second sub pixel group (e.g., formed by pixels $P_1''$ to $P_4''$) are 5% to 45% of an area of a single pixel (as shown in FIG. 5D). In some embodiments, the first region to the fourth region of a first sub pixel group (e.g., formed by pixels $P_1$ to $P_4$) are 50% of an area of a single pixel, and the first region to the fourth region of a second sub pixel group (e.g., formed by pixels $P_1'$ to $P_4'$) are 55% to 95% of an area of a single pixel (as shown in FIG. 5C).

According to the embodiments of FIGS. 5A to 5D, in addition to the offsets in two directions are obtainable according to the pixels arranged along the X direction (e.g., first pixels $P_1$, $P_1'$ and $P_1''$ and second pixels $P_2$, $P_2'$ and $P_2''$) and pixels arranged along the Y direction (e.g., third pixels $P_3$, $P_3'$ and $P_3''$ and fourth pixels $P_4$, $P_4'$ and $P_4''$), the objects of confirming depths and having different depth resolutions are implemented (described hereinafter with an example).

Figure 6:
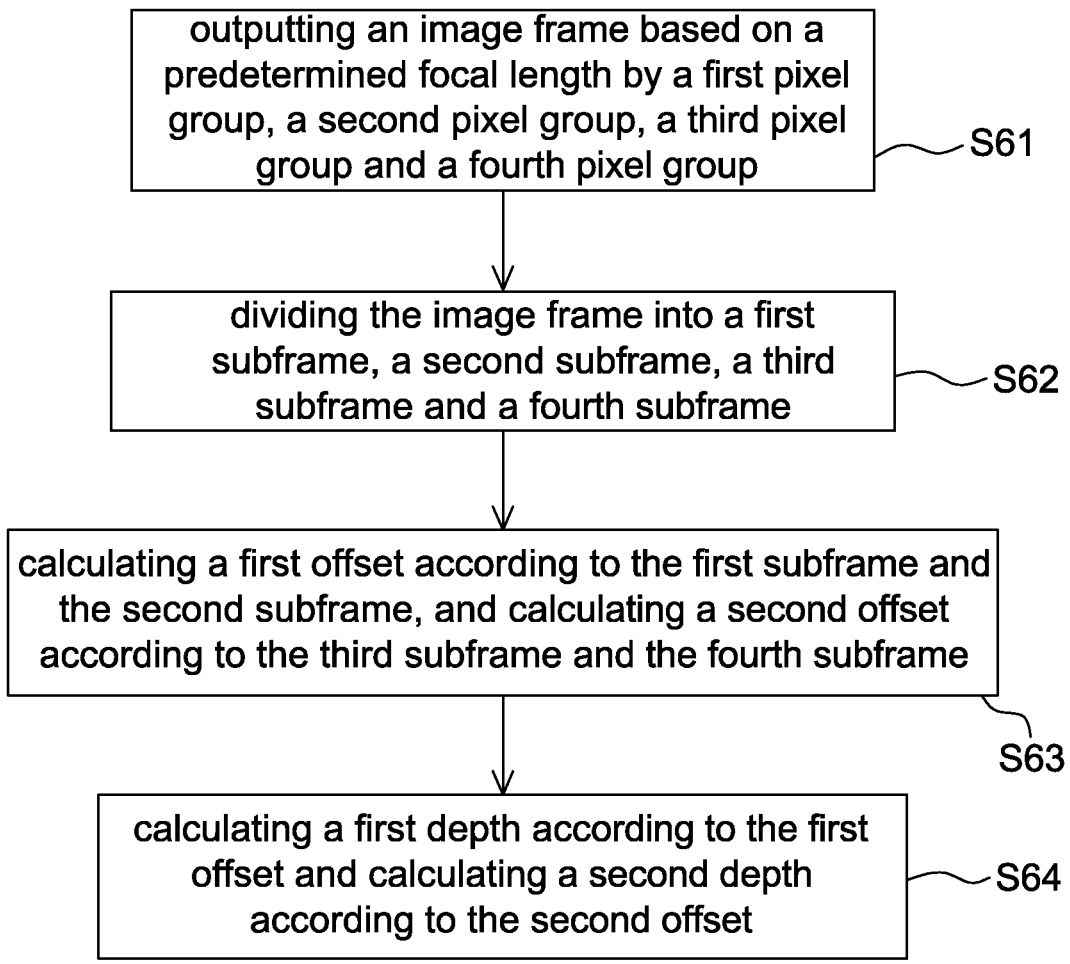
FIG. 6 is a flow chart of a distance measurement method according to an embodiment of the present disclosure.
Figure 8:
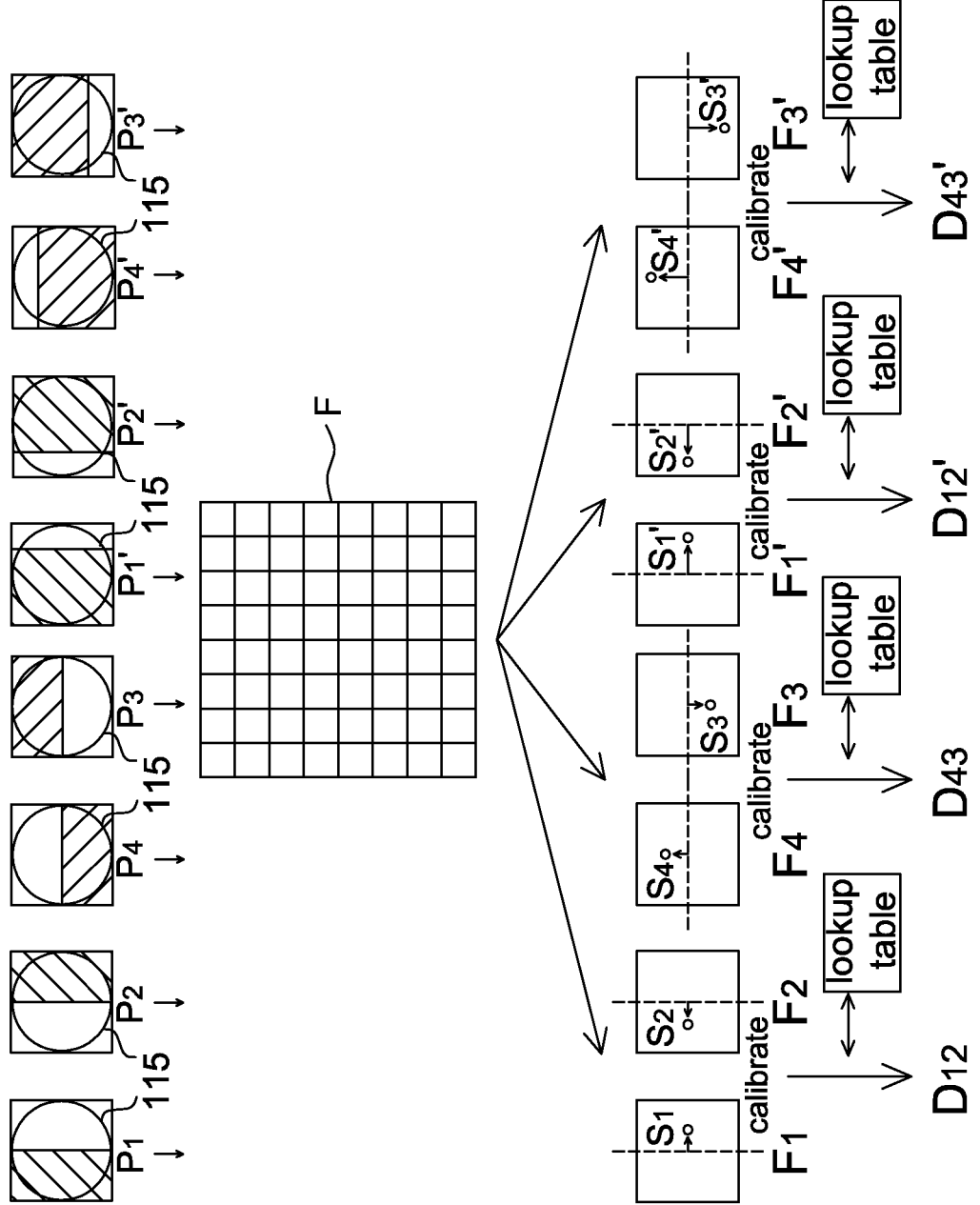
FIG. 8 is an operational schematic diagram of a distance measurement method according to an alternative embodiment of the present disclosure.

Referring to FIG. 6, it is a flow chart of a distance measurement method of a distance measurement device according to one embodiment of the present disclosure. The distance measurement device of this embodiment includes a first pixel group $P_1$, a second pixel group $P_2$, a third pixel group $P_3$, a fourth pixel group $P_4$ (as shown in FIGS. 5A to 5D) and a plurality of microlenses 115 (as shown in FIGS. 2A to 2B). The first pixel group $P_1$ and the second pixel group $P_2$ receive incident light of different phases respectively through a first part and a second part of the microlenses 115, and the third pixel group $P_3$ and the fourth pixel group $P_4$ receive incident light of different phases respectively through a third part and a fourth part of the microlenses 115, wherein the first part and the second part are two opposite sides of the microlenses 115 along a first axis (e.g., X direction), and the third part and the fourth part are two opposite sides of the microlenses 115 along a second axis (e.g., Y direction) as shown in FIG. 8.

The distance measurement method of this embodiment includes the steps of: outputting an image frame based on a predetermined focal length by a first pixel group, a second pixel group, a third pixel group and a fourth pixel group (Step S61); dividing the image frame into a first subframe, a second subframe, a third subframe and a fourth subframe (Step S62); calculating a first offset according to the first subframe and the second subframe, and calculating a second offset according to the third subframe and the fourth subframe (Step S63); and calculating a first depth according to the first offset and calculating a second depth according to the second offset (Step S64).

Referring to FIGS. 1, 5A to 5D, 6 and 8, the implementation of this embodiment is illustrated hereinafter.

Step S61: All pixels of the pixel matrix 111 detect light L passing through the condensing lens 10 with a predetermined focal length such that the first pixel group $P_1$, the second pixel group $P_2$, the third pixel group $P_3$ and the fourth pixel group $P_4$ output an image frame F. That is, the image frame F is formed by image data (e.g., gray values) outputted by the first pixel group $P_1$, the second pixel group $P_2$, the third pixel group $P_3$ and the fourth pixel group $P_4$.

Step S62: The frame division module 131 of the processor 13 then divides the image frame F into a first subframe $F_1$, a second subframe $F_2$, a third subframe $F_3$ and a fourth subframe $F_4$, wherein the first subframe $F_1$ is associated with the first pixel group $P_1$ (i.e. formed by gray level data outputted by the first pixel group $P_1$), the second subframe $F_2$ is associated with the second pixel group $P_2$ (i.e. formed by gray level data outputted by the second pixel group $P_2$), the third subframe $F_3$ is associated with the third pixel group $P_3$ (i.e. formed by gray level data outputted by the third pixel group $P_3$), and the fourth subframe $F_4$ is associated with the fourth pixel group $P_4$ (i.e. formed by gray level data outputted by the fourth pixel group $P_4$).

Step S63: The offset calculation module 133 of the processor 13 then calculates a first offset of corresponded image regions in the first subframe $F_1$ and the second subframe $F_2$ (e.g., an offset between $S_1$ and $S_2$) and a second offset of corresponded image regions in the third subframe $F_3$ and the fourth subframe $F_4$ (e.g., an offset between $S_3$ and $S_4$). As mentioned above, the calculation of the first offset and the second offset is calculated using the subtraction, block matching, motion detection or the like.

Step S64: The depth calculation module 135 of the processor 13 calculates a first depth $D_{12}$ according to the first offset and calculates a second depth $D_{43}$ according to the second offset. In this embodiment, the first depth $D_{12}$ is obtained, for example, according to the offset in a first direction referring to a lookup table, and the second depth $D_{43}$ is obtained, for example, according to the offset in a second direction referring to the lookup table, wherein the first direction is perpendicular to the second direction. As mentioned above, a lookup table previously stores a relationship of a plurality of offsets with respect to a plurality of depth differences distanced from the predetermined focal length.

Similarly, before calculating the first offset and the second offset, the processor 13 further calibrates brightness of the first subframe $F_1$ and the second subframe $F_2$ to be substantially identical and calibrates brightness of the third subframe $F_3$ and the fourth subframe $F_4$ to be substantially identical using a shading algorithm to correctly identify the corresponded object regions.

The above embodiment of FIG. 6 operates according to the arrangement of FIGS. 5A and 5B, and thus only the left part of FIG. 8 is considered. The embodiment blow of FIG. 7 operates according to the arrangement of FIG. 5C and thus the whole of FIG. 8 is considered. The operation according to the arrangement of FIG. 5D is similar to that according to the arrangement of FIG. 5C and thus details thereof are not repeated herein.

Figure 7:
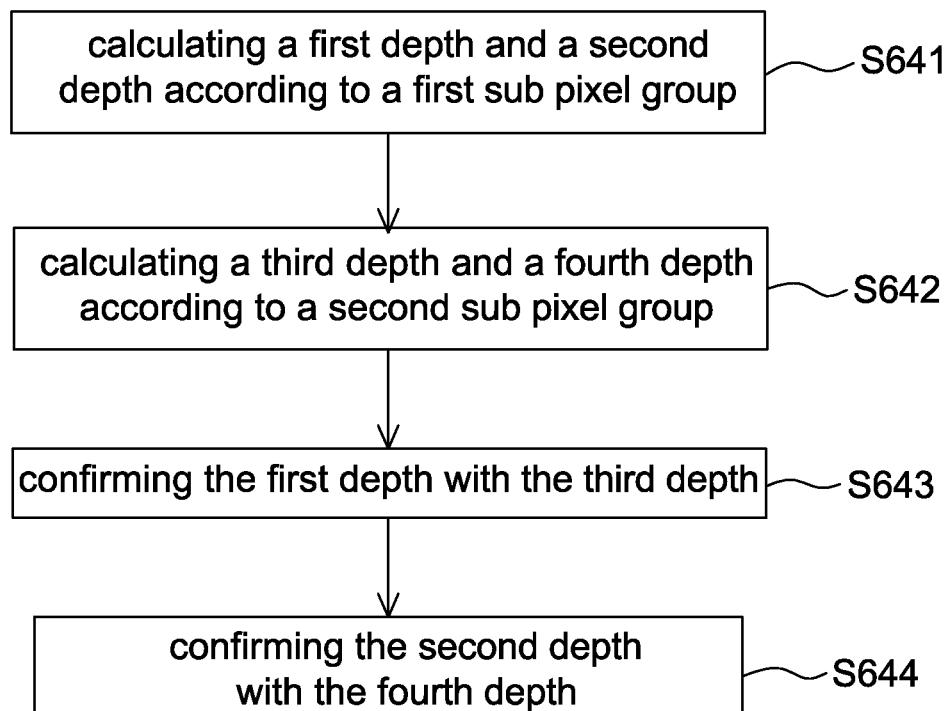
FIG. 7 is a flow chart of a distance measurement method according to another embodiment of the present disclosure.

Referring to FIG. 7, it is a flow chart of a distance measurement method of a distance measurement device according to another embodiment of the present disclosure. In this embodiment, one first pixel $P_1$ ($P_1'$), one second pixel $P_2$ ($P_2'$), one third pixel $P_3$ ($P_3'$) and one fourth pixel $P_4$ ($P_4'$) adjacent to each other form a sub pixel group. In two sub pixel groups adjacent along the first axis (e.g., X direction) and the second axis (e.g., Y direction), when the first region to the fourth region in a first sub pixel group (e.g., $P_1$ to $P_4$) are smaller than the first region to the fourth region in a second sub pixel group (e.g., $P_1'$ to $P_4'$), and when the first depth $D_{12}$ and the second depth $D_{43}$ are obtained according to the first sub pixel group (e.g., $P_1$ to $P_4$), the distance measurement method of this embodiment includes the steps of: calculating a first depth and a second depth according to the first sub pixel group (Step S641); calculating a third depth and a fourth depth according to the second sub pixel group (Step S642); confirming the first depth with the third depth (Step S643); and confirming the second depth with the fourth depth (Step S644), wherein the Step S641 is to perform the steps of FIG. 6, and the Step S642 is similar to FIG. 6 only the calculated sub pixel group is different. In addition, the Steps S641 and S642 are possible to operate simultaneously as shown in FIG. 8. The Step S642 is further illustrated below, whereas the Step S641 is not repeated herein.

All pixels of the pixel matrix 111 detect light penetrating the condensing lens 10 with a predetermined focal length, and the first pixel group $P_1'$, the second pixel group $P_2'$, the third pixel group $P_3'$ and the fourth pixel group $P_4'$ output a part of an image frame F. The other part of the image frame F is outputted by the first pixel group $P_1$, the second pixel group $P_2$, the third pixel group $P_3$ and the fourth pixel group $P_4$. That is, The image frame F is formed together by image data (e.g., gray values) outputted by the first pixel group $P_1$, the second pixel group $P_2$, the third pixel group $P_3$ and the fourth pixel group $P_4$ as well as the first pixel group $P_1'$, the second pixel group $P_2'$, the third pixel group $P_3'$ and the fourth pixel group $P_4'$.

The frame division module 131 of the processor 13 further divides the image frame F into a first subframe $F_1'$, a second subframe $F_2'$, a third subframe $F_3'$ and a fourth subframe $F_4'$, wherein the first subframe $F_1'$ is associated with the first pixel group $P_1'$ (i.e. formed by gray level data outputted by the first pixel group $P_1'$), the second subframe $F_2'$ is associated with the second pixel group $P_2'$ (i.e. formed by gray level data outputted by the second pixel group $P_2'$), the third subframe $F_3'$ is associated with the third pixel group $P_3'$ (i.e. formed by gray level data outputted by the third pixel group $P_3'$), and the fourth subframe $F_4'$ is associated with the fourth pixel group $P_4'$ (i.e. formed by gray level data outputted by the fourth pixel group $P_4'$).

The offset calculation module 133 of the processor 13 then calculates a first offset between corresponded image regions in the first subframe $F_1'$ and the second subframe $F_2'$ (e.g., an offset between $S_1'$ and $S_2'$), and calculates a second offset between corresponded image regions in the third subframe $F_3'$ and the fourth subframe $F_4'$ (e.g., an offset between $S_3'$ and $S_4'$). The calculation has been illustrated above, and thus details thereof are not repeated herein.

The depth calculation module 135 of the processor 13 calculates a third depth $D_{12}'$ according to the first offset and calculates a fourth depth $D_{43}'$ according to the second offset as shown in FIG. 8. Similarly, the third depth $D_{12}'$ is obtained according to the offset along a first direction by checking a lookup table and the fourth depth $D_{43}'$ is obtained according to the offset along a second direction by checking the lookup table.

In some cases, it is possible that one offset (e.g., the offset between $S_1$ and $S_2$ or between $S_1'$ and $S_2'$) corresponds to two depths, and thus in this embodiment two sets of different sub pixel groups are used to confirm one correct depth so as to improve the identification accuracy. For example in the Step S643, the third depth $D_{12}'$ is used to confirm the first depth $D_{12}$, and in the Step S644, the fourth depth $D_{43}'$ is used to confirm the second depth $D_{43}$, or vice versa.

In this embodiment, as the first sub pixel group and the second sub pixel group have different covered areas, the first depth $D_{12}$ and the second depth $D_{43}$ have a first resolution, and the third depth $D_{12}'$ and the fourth depth $D_{43}'$ have a second resolution different from the first resolution so as to improve the applicable range.

It should be mentioned that although the distance measurement method of FIG. 6 is illustrated by using the schematic diagram of FIG. 8, the present disclosure is not limited thereto. When the cover pattern of the cover layer 113 is like FIG. 3, the Steps S61 to S64 do not include the third and fourth pixel groups or do not include the first and second pixel groups, and operate only according to FIG. 4. Accordingly, the operating method includes the steps of: outputting an image frame by a first pixel group and a second pixel group with a predetermined focal length; dividing the image frame into a first subframe and a second subframe; calibrating the first subframe and the second subframe to have substantially identical brightness; calculating an offset of a corresponded image region respectively in the first subframe and the second subframe; and calculating a depth of the image region according to the offset. Or the operating method includes the steps of: outputting an image frame by a third pixel group and a fourth pixel group with a predetermined focal length; dividing the image frame into a third subframe and a fourth subframe; calibrating the third subframe and the fourth subframe to have substantially identical brightness; calculating an offset of a corresponded image region respectively in the third subframe and the fourth subframe; and calculating a depth of the image region according to the offset.

More specifically, it is possible that the present disclosure calculates depths of different image regions according to different arrangements of the cover layer 113. In addition, the processor 13 determines the depth of the image region to be calculated according to different applications, e.g., calculating the depth according to only two pixel groups but ignoring pixel data of other pixel groups.

In the present disclosure, as the first pixel group includes a plurality of first pixels, the first pixel group and the first pixels are both indicated by a reference numeral $P_1$. Similarly, the second pixel group and the second pixels are both indicated by a reference numeral $P_2$, the third pixel group and the third pixels are both indicated by a reference numeral $P_3$, and the fourth pixel group and the fourth pixels are both indicated by a reference numeral $P_4$.

In addition, when the distance measurement device 1 is used to detect one object, corresponding to a two dimensional position of an object image in the image frame, the processor 13 further calculates a three dimensional coordinate of the object according to the two dimensional position and an object depth.

In addition, when the distance measurement device 1 is used to detect a plurality of objects, it is possible to further calculate both the depths and three dimensional coordinates of the plurality of objects according to the distance measurement methods of FIGS. 6 and 7.

In addition, although the present disclosure takes a dot object 9 as an example for illustration, the present disclosure is not limited thereto. Actually, the distance measurement device 1 does not necessary to recognize any object but respectively calculates depths of every image region according to the above distance measurement methods to construct a depth map of the image frame F.

It should be mentioned that values in above embodiments, e.g., the size and area ratio of the image frame F, are only intended to illustrate but not to limit the present disclosure. The element scale and arrangement as well as the direction in the drawings of the present disclosure are only intended to illustrate but not to limit the present disclosure.

It should be mentioned that in the above embodiments although the cover layer 113 is shown to be covered upon every pixel, it is only intended to illustrate but not to limit the present disclosure. In other embodiments, the cover layer 111 covers upon only a part of pixels of the pixel matrix 111, wherein outputted data of the part of pixels being covered by the cover layer 113 is used to identify a depth of the image region, and outputted data of the uncovered pixels is for other functions, e.g., the gesture recognition.

As mentioned above, the conventional distance measurement system and the gesture recognition system need a higher cost and size, and generally an additional light source is required. Therefore, the present disclosure provides an optical distance measurement device (FIG. 1) and a distance measurement method thereof (FIGS. 6-7) that calculate the depth of image regions according to the offset of image positions caused by the phase difference between incident light penetrating different parts of microlenses. As a light source is no longer required, it has the advantages of low cost and small size.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A distance measurement device, comprising:
a condensing lens having a predetermined focal length;
an image sensor configured to detect light passing through the condensing lens and output an image frame, the image sensor comprising:
a pixel matrix comprising a first pixel group and a second pixel group arranged in a first direction and a second direction;
a cover layer covering upon a first region of a plurality of first pixels of the first pixel group and upon a second region of a plurality of second pixels of the second pixel group, wherein the first region and the second region are rectangles of mirror symmetry along the first direction, and the rectangles fully cover one of four edges of the first pixels and the second pixels in the first direction; and
a plurality of microlenses, each of the microlenses aligned with at least one of one of the first pixels and one of the second pixels; and
a processor configured to calculate a depth of an image region in the image frame.

2. The distance measurement device as claimed in claim 1, wherein the processor is configured to
divide the image frame into a first subframe and a second subframe,
calculate an offset corresponding to the image region according to the first subframe and the second subframe, and
calculate the depth according to the offset,
wherein the first subframe is associated with the first pixel group and the second subframe is associated with the second pixel group.

3. The distance measurement device as claimed in claim 2, wherein the processor further comprises a storage unit configured to previously store a relationship of a plurality of offsets and a plurality of depth differences from the predetermined focal length.

4. The distance measurement device as claimed in claim 2, wherein the processor is further configured to calibrate brightness of the first subframe and the second subframe to be identical using a shading algorithm.

5. The distance measurement device as claimed in claim 1, wherein the first region and the second region are 5% to 95% of an area of a single pixel.

6. The distance measurement device as claimed in claim 1, wherein
the pixel matrix further comprises a third pixel group and a fourth pixel group,
the cover layer further covers upon a third region of a plurality of third pixels of the third pixel group and upon a fourth region of a plurality of fourth pixels of the fourth pixel group, and
the third region and the fourth region are rectangles of mirror symmetry along the second direction, wherein the rectangles fully cover one of four edges of the third pixels and the fourth pixels in the second direction.

7. The distance measurement device as claimed in claim 6, wherein
one of the first pixels, one of the second pixels, one of the third pixels and one of the fourth pixels adjacent to each other form a sub pixel group, and
the first region, the second region, the third region and the fourth region in the sub pixel group have identical areas.

8. The distance measurement device as claimed in claim 7, wherein in two sub pixel groups adjacent in the first direction and the second direction, the first region to the fourth region in a first sub pixel group are 50% of an area of a single pixel, and the first region to the fourth region in a second sub pixel group are 5% to 45% or 55% to 95% of an area of a single pixel.

9. The distance measurement device as claimed in claim 6, wherein the first pixels are adjacent to the second pixels along a diagonal direction of the pixel matrix, and the third pixels are adjacent to the fourth pixels along another diagonal direction of the pixel matrix.

10. The distance measurement device as claimed in claim 1, wherein the cover layer is formed by electrical paths in the pixel matrix.

11. A distance measurement device, comprising:

a condensing lens having a predetermined focal length;

a pixel matrix comprising a first pixel group, a second pixel group, a third pixel group and a fourth pixel group arranged along a first direction and a second direction, and configured to detect light passing through the condensing lens to output an image frame; and a cover layer covering upon the pixel matrix, the cover layer comprising:

a first cover pattern covering upon a first region of a plurality of first pixels of the first pixel group;

a second cover pattern covering upon a second region of a plurality of second pixels of the second pixel group;

a third cover pattern covering upon a third region of a plurality of third pixels of the third pixel group; and a fourth cover pattern covering upon a fourth region of a plurality of fourth pixels of the fourth pixel group;

wherein the first region and the second region are rectangles of mirror symmetry along the first direction, the third region and the fourth region are rectangles of mirror symmetry along the second direction, the rectangles fully cover one of four edges of the first pixels and the second pixels in the first direction, and the rectangles fully cover one of four edges of the third pixels and the fourth pixels in the second direction.

12. The distance measurement device as claimed in claim 11, wherein one of the first pixels, one of the second pixels, one of the third pixels and one of the fourth pixels adjacent to each other form a sub pixel group, and in two sub pixel groups adjacent along the first direction and the second direction, the first region to the fourth region of a first sub pixel group are 50% of an area of a single pixel, and the first region to the fourth region of a second sub pixel group are 5% to 95% of an area of a single pixel.

13. The distance measurement device as claimed in claim 11, wherein the first pixels are adjacent to the second pixels along a diagonal direction of the pixel matrix, and the third pixels are adjacent to the fourth pixels along another diagonal direction of the pixel matrix.

14. The distance measurement device as claimed in claim 11, wherein the cover layer is formed by electrical paths in the pixel matrix.

15. The distance measurement device as claimed in claim 11, further comprising a processor configured to divide the image frame into a first subframe and a second subframe, wherein the first subframe is associated with the first pixel group and the second subframe is associated with the second pixel group, divide the image frame into a third subframe and a fourth subframe, wherein the third subframe is associated with the third pixel group and the fourth subframe is associated with the fourth pixel group, calculate a first offset of a corresponded image region in the first subframe and the second subframe, and calculate a second offset of the corresponded image region in the third subframe and the fourth subframe, and calculate a first depth of the image region according to the first offset, and calculate a second depth of the image region according to the second offset.

16. The distance measurement device as claimed in claim 11, wherein each pixel of the pixel matrix has four different edges, and the first cover pattern, the second cover pattern, the third cover pattern and the fourth cover pattern fully cover a different edge among the four edges of the covered pixel, respectively.

* * * * *